(12) United States Patent
Bergman et al.

(10) Patent No.: US 8,473,914 B2
(45) Date of Patent: Jun. 25, 2013

(54) SEMI-AUTOMATED UPDATE OF APPLICATION TEST SCRIPTS

(75) Inventors: Lawrence D. Bergman, Mt. Kisco, NY (US); Vittorio Castelli, Croton on Hudson, NY (US); Robert Levy, Watertown, MA (US); Frank McGrath, Wellesley, MA (US); Serge E. Lucio, Saint Leon (FR)

(73) Assignee: International Business Machines Corporation, Armonk, NY (US)

( * ) Notice: Subject to any disclaimer, the term of this patent is extended or adjusted under 35 U.S.C. 154(b) by 1738 days.

(21) Appl. No.: 11/764,983

(22) Filed: Jun. 19, 2007

(65) Prior Publication Data

US 2008/0320462 A1 Dec. 25, 2008

(51) Int. Cl.
 *G06F 9/44* (2006.01)
(52) U.S. Cl.
 USPC ............ 717/124; 717/126; 717/131; 717/132
(58) Field of Classification Search
 USPC .................................. 717/124, 126, 131, 132
 See application file for complete search history.

(56) References Cited

U.S. PATENT DOCUMENTS

| 7,096,388 | B2* | 8/2006 | Singh et al. ................ 714/38.12 |
| 7,913,231 | B2* | 3/2011 | Stienhans et al. ............. 717/125 |
| 2006/0253742 | A1* | 11/2006 | Elenburg et al. ................ 714/38 |

OTHER PUBLICATIONS

Grechanik, et al. "Maintaining and Evolving GUI-Directed Test Scripts", 2009, IEEE, p. 408-418.*

* cited by examiner

*Primary Examiner* — Qamrun Nahar
(74) *Attorney, Agent, or Firm* — Jeffrey N. Giunta; Fleit Gibbons Gutman Bongini & Bianco PL

(57) ABSTRACT

An apparatus and method for maintaining a collection of test scripts. At least one test script module is identified that is common to at least two unmodularized test scripts that are each associated with a common application. The at least two unmodularized test scripts are divided into modularized test scripts that each comprise the at least one test script module. An update to the common application is received and at least one of the at least one test script modules is updated in response to the update of the common application. The updating of each of the at least one of the at least one test script module causes a corresponding update to the at least two unmodularized test scripts.

18 Claims, 8 Drawing Sheets

SEMI-AUTOMATED UPDATE OF APPLICATION TEST SCRIPTS

FIELD OF THE INVENTION

The present invention relates generally to updating test scripts to correspond to changes made to a graphical user interface, and, in particular, to utilizing commonality among the scripts to minimize the amount of manual updating of a script library.

BACKGROUND OF THE INVENTION

A problem encountered in automated testing of software applications is maintaining a set of test "scripts" when the changes are made to the software application. Scripts consist of computer instructions that are typically interpreted by the user interface as though there were typed directly from a keyboard. Thus, scripts are often distinguished from programs, because programs are converted permanently into binary executable files (i.e., zeros and ones) before they are run. Scripts remain in their original form and are interpreted command-by-command each time they are run. Testers create and maintain large sets of test scripts, often numbering in the thousands for a single application. These test scripts automate interactions with the application GUI, performing actions with GUI objects such as simulating the pushing of buttons or making menu selections.

Scripts are typically created in one of two ways. In the first, the tester performs the actions manually using a software recorder which keeps track of the actions performed and their context. The second is by manually creating the scripts, typically with a text editor, in a programming language, a scripting language, or some special-purpose language designed for test generation. Some testing systems support a hybrid of these, with an initial script created by demonstration and with enhancements to the script supported via manual editing.

Scripts created in these ways tend to be very dependent on the structure of a particular GUI. The script typically contains information on where to find each GUI element that is to be activated on replay. For example, a particular button labeled "submit" might be located in a section of the GUI with a section label "book flight", which in turn is contained in a tab labeled "itinerary". The script might contain an explicit description of such location information (e.g., "Activate itinerary→book flight→submit") or an implicit description which is not viewable by the tester, but allows the test engine to locate the control on replay.

During an application's lifecycle, the GUI may undergo substantial changes—GUI elements may be moved to other parts of the application, their type may change (for example, a button may be converted into a menu item), or particular sequences of operations may be converted into different sequences that accomplish the same goals. These changes are examples of changes that may invalidate some or all of each script within a previously created library of test scripts.

Therefore a need exists for a method and system to facilitate the maintenance of libraries of scripts, particularly the maintenance of scripts in response to changes in the software application being tested so as to overcome the problems with the prior art as discussed above.

SUMMARY OF THE INVENTION

In accordance with one aspect of the present invention, a method of maintaining a collection of test scripts includes identifying at least one test script module that is common to at least two unmodularized test scripts that are each associated with a common application. The method also includes dividing the at least two unmodularized test scripts into modularized test scripts that each comprise the at least one test script module. The method further includes receiving an update to the common application and updating at least one of the at least one test script module in response to the update of the common application. The updating of each of the at least one of the at least one test script module causes a corresponding update to the at least two unmodularized test scripts.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
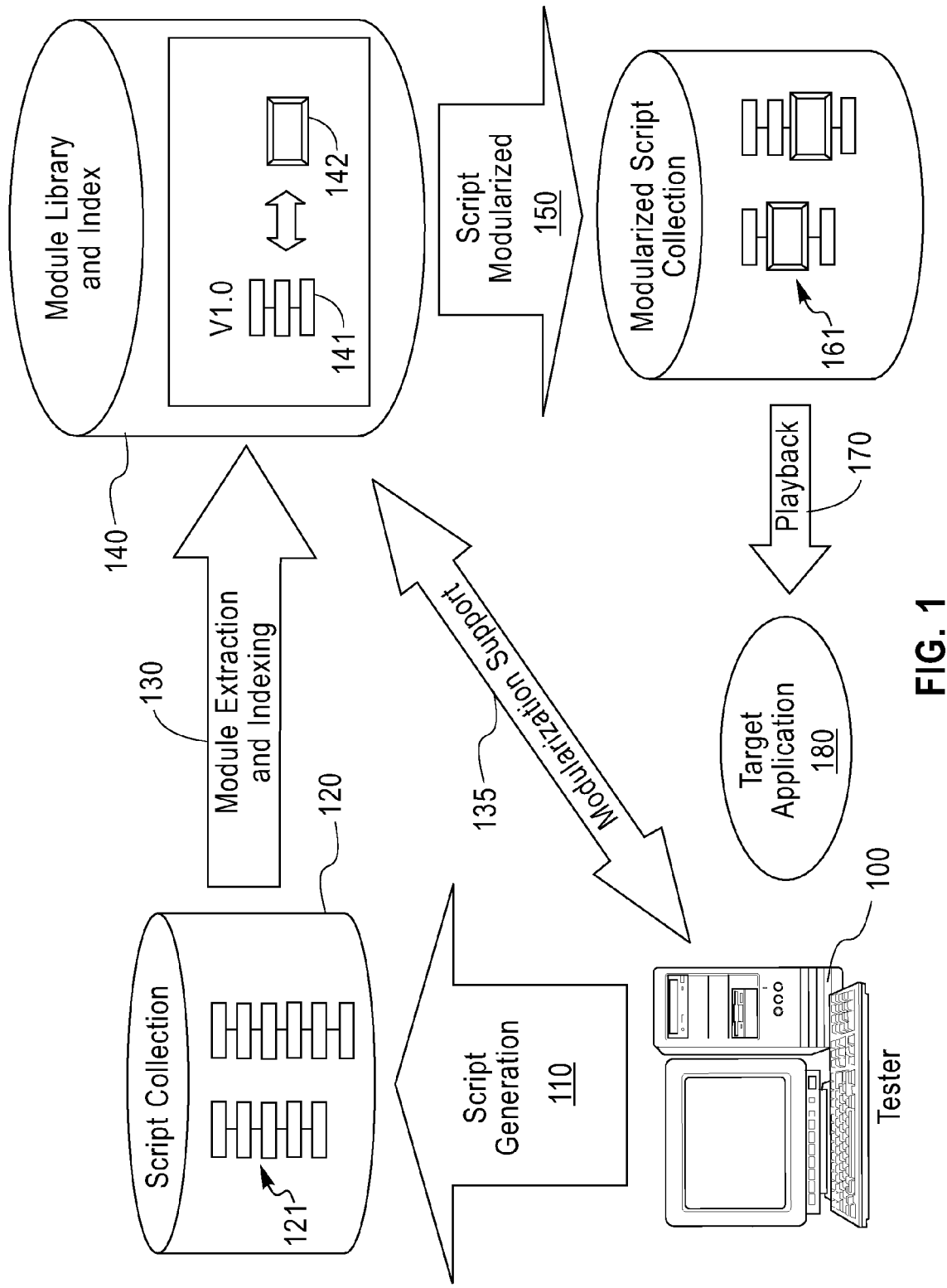
FIG. 1 is a flow diagram showing the initial creation of a modularized description of a script library in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward.

Described now is an exemplary method and apparatus that facilitates the maintenance of script libraries. According to an embodiment of the present invention, common sub-procedures are extracted from an existing script library. The common sub-procedures are employed in a semi-automated process for updating the script library when the application being tested undergoes changes to its GUI structure. By determining and grouping theses sub-procedures, great efficiency can be realized due to the fact that a single change can be automatically rippled throughout multiple scripts, thus obviating the need for an operator to make adjustments to each script.

Figure 2:
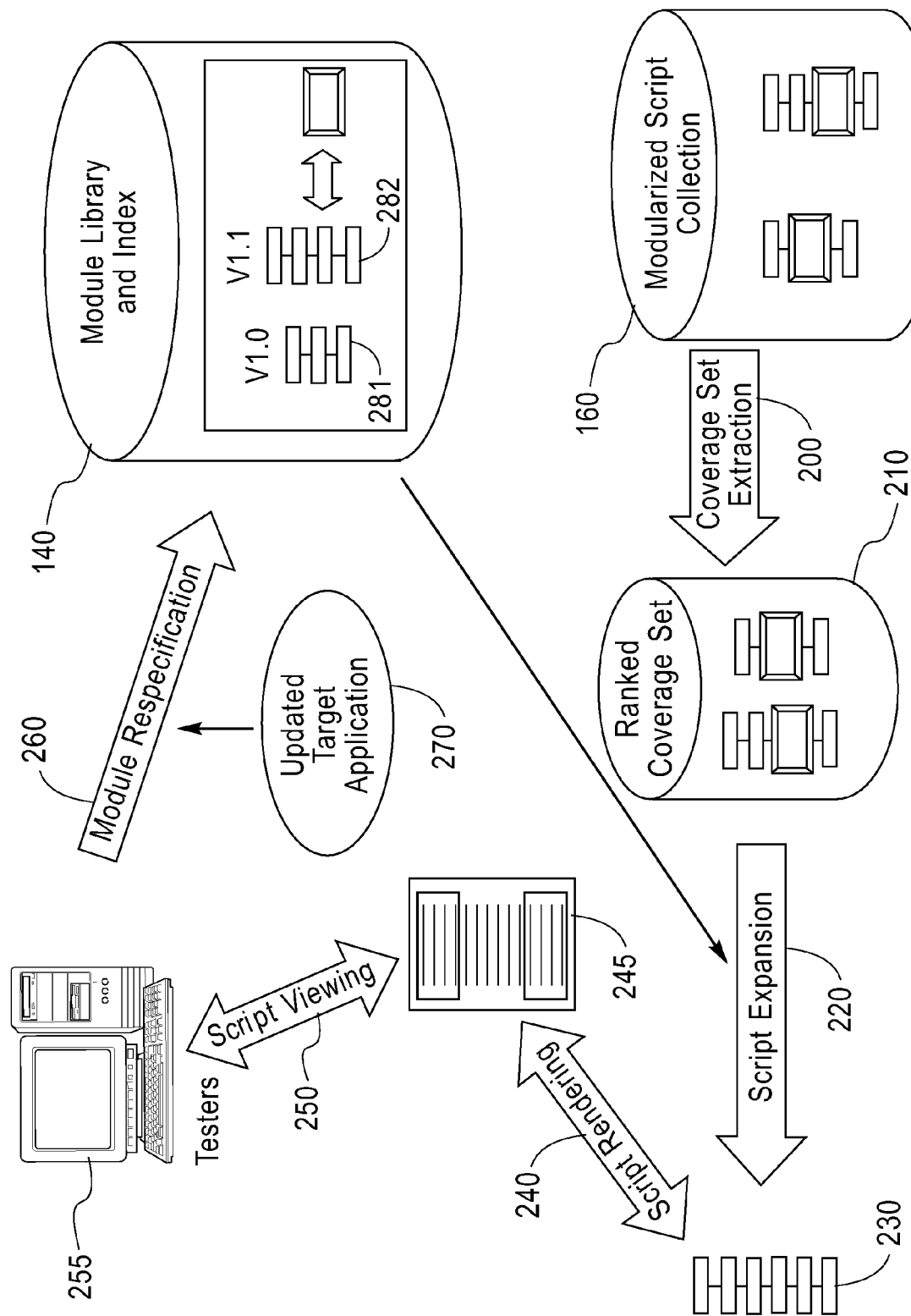
FIG. 2 is a flow diagram showing a process of updating a module library and a script collection when an application GUI is updated, in accordance with an embodiment of the present invention.

FIGS. 1 and 2 show an overview of a semi-automatic script creation and update process in accordance with an embodiment of the present invention. Referring first to FIG. 1, the initial creation of a modularized description of a script library is shown. A tester 100 via a script generation process 110 creates a plurality of test scripts 121 for a common application. In one embodiment, a common application is a set of software that all use common user interface commands to perform similar tasks. A common application is able to be one application or a set of related application such that maintenance of one related application will affect the operation of the other related applications.

A test script, also referred to as a "script" in this description, contains the actions to be performed on the common application user interface, such as clicking a button, filling in a dialog box, or entering text commands. Scripts also contain optional control logic, such as conditionals or loops. The generation process may be via a recording mechanism that records the tester's movements, a manual editing process, or any other process that allows the tester to specify a series of user interface-based operations that are to be performed in testing the target application. The scripts 121 are stored in a script collection 120. The script collection 120 can be stored in a variety of ways including individual files on a file system, entries in a database or members within a compressed file. The script collection 120 is also able to be distributed across multiple file systems or stored in any other suitable way.

A "module" is a sub-sequence of steps within a script that accomplishes a particular task. For instance, the combination of steps "click 'log in'," "enter password," and "click 'OK'" would be one module, as they accomplish the task of logging in to a system. In one embodiment, testers create test scripts that are unmodularized, i.e., test script modules that might be shared by multiple test scripts are not identified during the actual creation of the test scripts by the tester. In one embodiment, the script collection 120 is analyzed by a module extraction and indexing process 130 to identify at least one test script module that is common to at least two of the unmodularized test scripts. In one embodiment, this is an automated software process that searches for common sequences of operations within and between test scripts in the script collection 120. The tester 100 is able to provide feedback to the module extraction 130 via a user-in-the-loop modularization support component 135. Examples of such feedback include naming the module, entering a description of the module, adding or deleting steps, and other actions. Extracted modules 141 are assigned module descriptors 142 and stored in a module library 140. The module library contains an index that permits rapid retrieval of modules, which are keyed by their sequence of operations.

Once the library 140 of modules has been created, scripts 121 in the script collection 120 can be modularized via a script modularization component 150. This is a software module that processes each script 121 in the script collection 120, searches the script 121 for all subsequences that have corresponding definitions in the module library 140, and replaces each such subsequence with the corresponding module descriptor 142. In one embodiment, the script modularization component 150 compares a task coverage of a portion of at least two unmodularized test scripts stored in the script collection 120 to the respective task coverage of one or more test scripts modules stored in the module library 140 to identified modules to use in defining modularized test scripts. The result is a set of modularized scripts 161 stored in a modularized script collection 160 that correspond to scripts 121. The test script modules that are determined to make up a particular test script are referred to as composite test script modules. The modularized script collection 160 can be stored in any suitable manner, including any of the ways described for the script collection. Any (or all) of the modularized scripts can be selected for testing, and can be executed by the playback mechanism 170 on the target application 180.

FIG. 2 shows a process, according to an embodiment of the present invention, of updating the module library 140 and the script collection 160 of FIG. 1 when the application GUI is updated. By utilizing an embodiment of the present invention, programmers no longer need to sift through each line of code to determine which scripts require adjustment to accommodate, for example, an update of a software application's user interface.

The modularized script collection 160 is processed by a coverage set extraction software component 200, which ranks the modularized scripts to produce a ranked coverage set 210. The ranking is based on the extent to which a given script contains modules that are common to other scripts. In other words, the first script in the ranking will be that script which has more statements in common with other scripts in the collection (based on the extracted modules) than any other. The ranking allows those modules that appear in the greatest number of scripts to be adjusted first. For instance, if a login module is required for 60% of the possible GUI interactions, adjusting the login module to accommodate an adjustment made to the login box of a GUI in the target application will, in a single step, automatically update the login portion of all 60% of those scripts without needing to manually adjust that portion of each individual script. This ranking provides greater efficiency in ordering the update process, but is not a requirement of the present invention.

Figure 3:
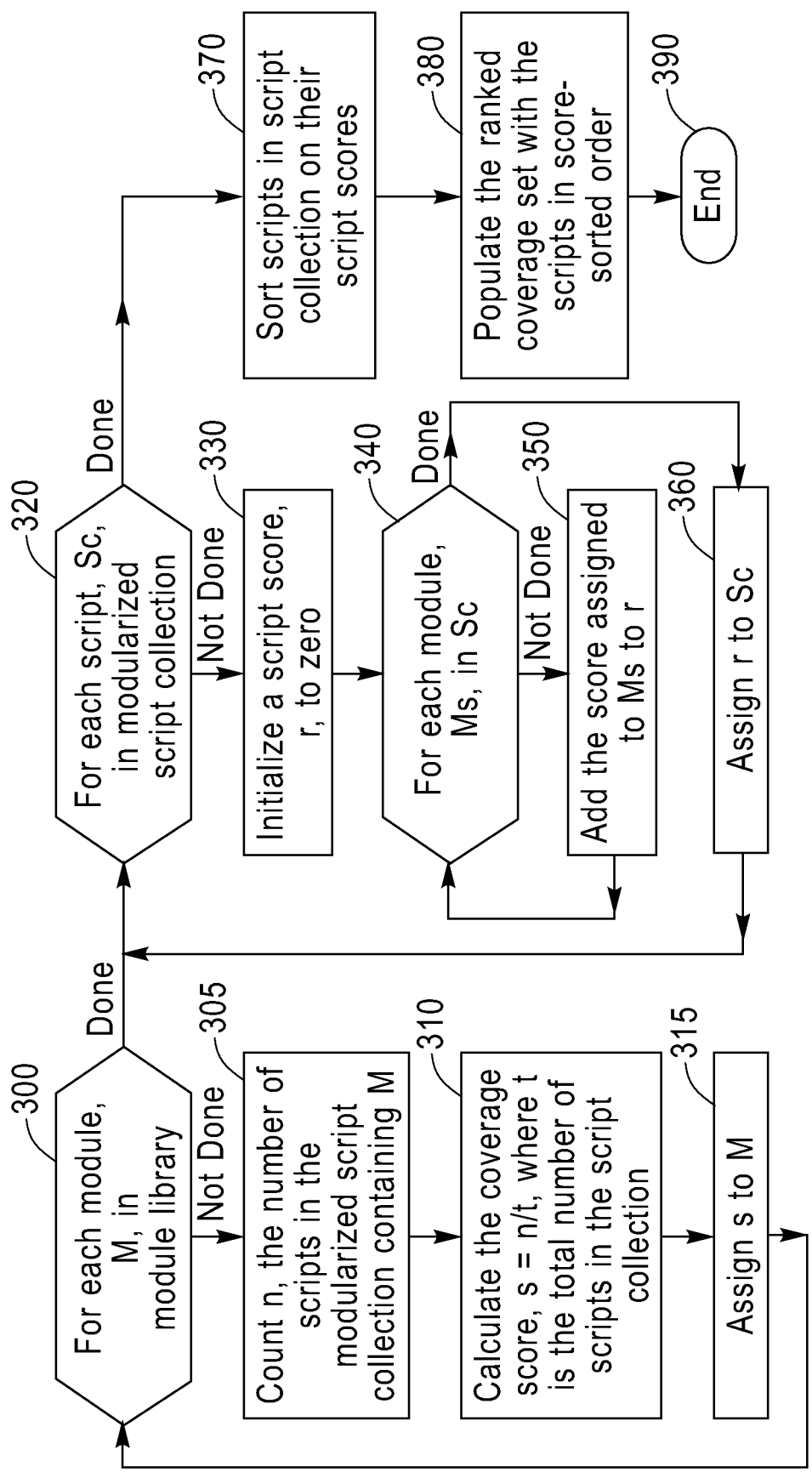
FIG. 3 is a flow diagram showing a process of performing coverage-set extraction in accordance with an embodiment of the present invention.

A number of methods can be used for performing the step of coverage set extraction 200, shown in FIG. 2. One such method is shown in FIG. 3. One of ordinary skill in the art may easily devise more efficient methods using more sophisticated indexing techniques, which remain in the spirit and scope of the present invention.

The first stage of the algorithm consists of assigning a coverage score to each module in the module library 140. This score represents the fraction of scripts in the script collection 120 that contain the respective module. For the purposes of the algorithm of one embodiment, the fact that a single script could contain a module more than once is not taken into account; more advanced scoring schemes of further embodiments that do account for multiple occurrences of a module in a single script are easily envisioned. In this first stage of the algorithm, Loop 300 iterates the module scoring steps 305, 310, and 315 on each module, M, in the module library 140. In step 305, for the module M, the algorithm scans all scripts in the modularized script collection 160, counting the number of scripts, n, that contain module M. A coverage score, s, is then computed in step 310 as the fraction of the number of scripts containing module M, which is identified as "n," divided by the total number of scripts in the modularized script collection. In step 315, the score, s, is assigned to the module M either by setting a field in the data structure which stores the modularized scripts, or in a separate indexing structure. Once Loop 300 is complete, the process moves to the second stage of the algorithm, Loop 320.

The second stage of the algorithm, Loop 320, assigns a coverage score to each script in the modularized script collection. This score embodies the extent to which the script contains common code, representative of the module library as a whole. Note that there are many other possible metrics that can be used to prioritize modules for maintenance. In particular, the score of one embodiment does not take into account the number of statements within a module. Further embodiments incorporate that factor and others in their scoring schemes.

In the second stage of the algorithm, Loop 320 iterates steps 330 to 360 for each script, Sc, in the modularized script collection 160. A script coverage score, r, is initialized to zero in step 330 and then each module, Ms in the script Sc is processed in Loop 340, which follows step 330. The module score associated with Ms, which was determined in step 310, is added to the score, r, in step 350. When all the modules in the script have been handled, the resulting value of r is a total coverage score, which is then associated with the script Sc in step 360. This score, although not normalized, is useful for comparing scripts against each other to find scripts which are most representative of the entire set of modules.

The flow then moves to the final stage of the algorithm, steps 370 and 380, where the modularized scripts are ranked. First the scripts are sorted using the script coverage score in step 370. The flow then moves to step 380 where the sorted scripts are used to populate the ranked coverage set 210 of FIG. 2. The flow ends at step 390.

Returning back to FIG. 2, modularized scripts are selected based on their ranked order and expanded by a script expansion module 220, using the module definitions in the module library 140. The expanded script 230 is then rendered by a script rendering component 240 into a human-readable representation 245 and presented 250 to a tester 255. The human-readable representation shows the modules that require updating. Those modules that need updating can be indicated by highlighting the module or any other method of indication that will convey the need to a tester.

Through a module respecification component 260, the tester specifies an update for each module in a given script. Optionally, the updated application GUI 270 may be involved in the update process, by, for example, the tester performing module steps on the updated application GUI 270 to, for example, demonstrate the steps required for a particular module. Each updated module definition 282 is inserted into the module library 140. The updated module definition 282 is stored along with the original definition 281, each labeled with appropriate application version numbers.

This process continues for scripts in the ranked coverage set 210 according to the ranking of these scripts. Whenever possible, the current version of test script modules, as opposed to previous versions of the test script modules, are used to recreate a particular test script. The representation 245 presented to the tester 255 reflects the current module state and highlights modules for respecification only if they have not previously been specified for the current application version. In this way, a minimum amount of respecification is performed.

Figure 4:
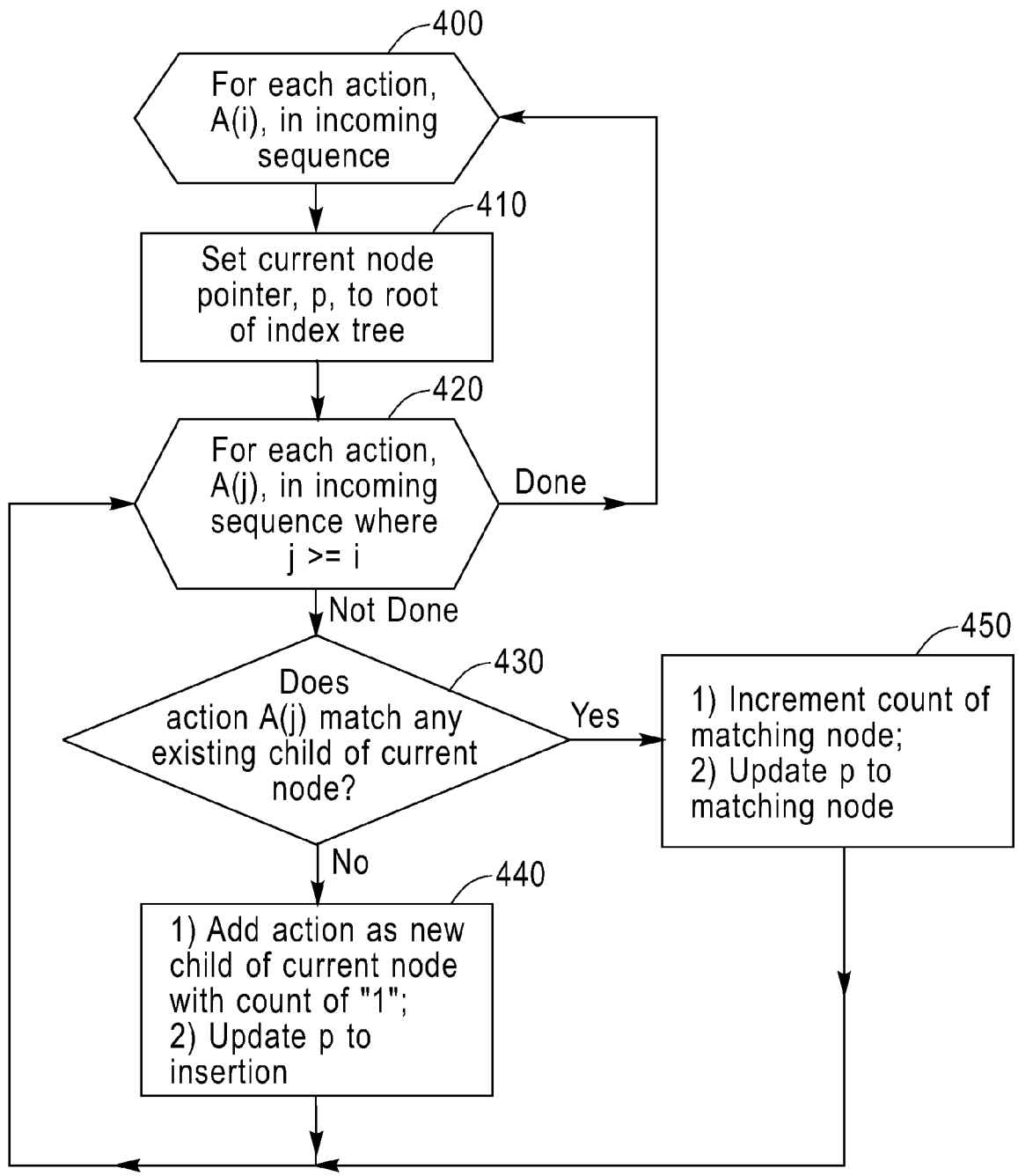
FIG. 4 is a graphical representation of an algorithm for incrementally building an index structure in accordance with an embodiment of the present invention.
Figure 5:
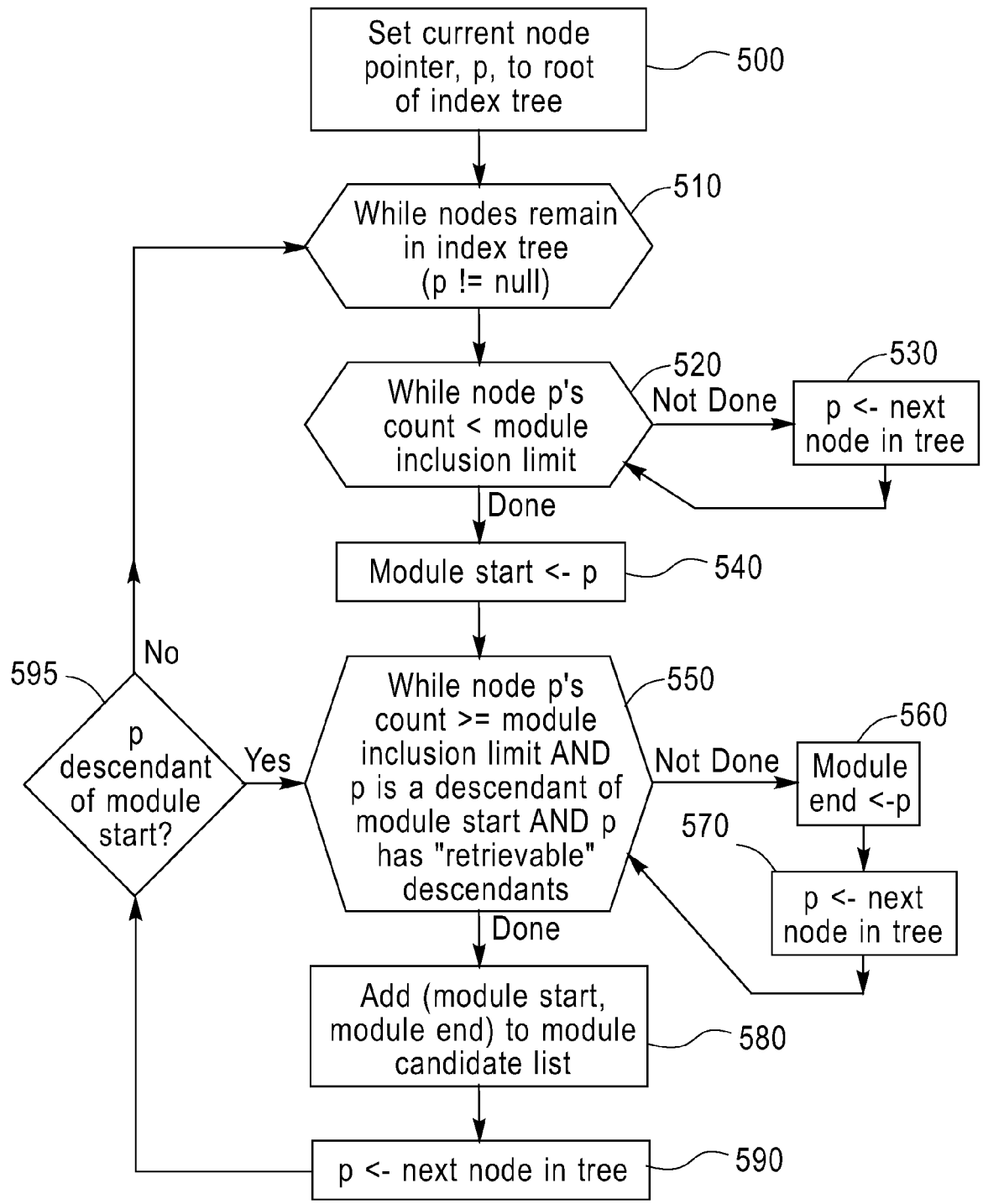
FIG. 5 is a graphical representation of an algorithm for extracting module candidates in accordance with an embodiment of the present invention.

FIGS. 4 and 5 describe a method for extracting and indexing modules such as is performed by the module extraction and indexing process 130 shown in FIG. 1. It will be clear to one of ordinary skill in the art that there are a number of techniques that could be used to extract common modules from a collection of scripts 120, including linear search, other tree-based techniques, techniques that employ hash tables, and others that are in the spirit and scope of the present invention.

FIG. 4 presents an algorithm for incrementally building an index structure. The algorithm is performed for each script 121 in the script collection 120. The algorithm creates a tree-structure, such as that shown in FIG. 6 and described in detail below, that encodes the sequencing of operations within scripts, which permits both rapid incremental update as well as easy extraction of modules. Again, a module is a sub-sequence of steps within a script that is shared by multiple scripts. Each node in the tree corresponds to a single script action. A script action can consist of either an action on the application user interface (such as "click OK") or a logic statement (such as an "if" conditional statement). Each node also has a count associated with it, which indicates the number of occurrences of that action in the scripts that have been processed. The node structure can also contain pointers to all of the script actions associated with the node to facilitate script modularization. Such pointers are not necessary for the method to operate correctly.

The algorithm is initialized with a tree structure containing a single node labeled "start". The algorithm of FIG. 4 shows the processing for a single script to be added to the tree. A script is composed of actions. In this application, the term "action" denotes both a simple GUI action (such as "click the OK button"), and a logic statement (such as a conditional or a loop structure). If a script has n actions, they are denoted as $A(1), A(2), \ldots, A(n)$ where the index refers to the order in which they appear in the script. Step 400 iterates the processing consisting of steps 410 to 450 on each action, $A(i)$, in the script. A "current node" pointer, p, is maintained by the algorithm, and is initialized to the "start" node (the tree root) for each $A(i)$ at step 410. The processing steps that follow step 410 in FIG. 4 are iteratively executed for each $A(i)$ in the script. Actions processed during a specific iteration of the 420 loop are denoted by $A(j)$, where j varies from i+1 to n. $A(j)$ is checked against all children nodes of the current node indicated by pointer, p, in step 430. Here, it is assumed that there is at most a single match, $A(c)$, if any. If there is more than one match, just the first match is used. Alternatively, further embodiments of the present invention incorporate algorithms that handle multiple of all matches.

The matching of child nodes can be exact or inexact. For a simple GUI action, an exact match would require the same GUI element(s) in both $A(j)$ and $A(c)$, as well as the same parameters (such as the string typed into an entry field). A variety of inexact matching algorithms can alternatively be employed, including those that require identity of the GUI elements but with inexact matching of parameters, as well as those that employ inexact matching of the GUI elements themselves. An example of an inexact match is the detection of a correspondence between the actions, "type the string 'fred smith' into the employee name field" and "type the string 'smith, fred' into the employee name field." Inexact matches are able to further include an associated match score, for example, a score of 0.8 out of a possible 1.0. The determination of a match is then made by comparing the match score to a predetermined minimum match score.

Based on the matching 430, the algorithm takes one of two sets of actions. If there is no match, the process moves to step 440 and adds $A(j)$ as a new child of the node pointed to by p with a count of 1, and p is updated to point to $A(j)$. If there is a match, the process moves to step 450 and increments the count of $A(c)$ by 1 and updates p to point to $A(c)$. The process moves from both step 440 and step 450 back up to step 420 where the iteration is continued by incrementing the value of j by 1, and executing steps 430 to 440 or 450 on the new $A(j)$ until j reaches n+1, where n is the number of actions in the script. When j reaches N+1, the processing of the original node p is complete and processing returns to step 400 for the next action.

FIG. 5 describes an algorithm for extracting module candidates according to an embodiment of the present invention. The process begins at step 500 where a position pointer, p, is initialized to the root of the index tree. In step 510, an outer loop for the algorithm is executed that iterates through each node of the index tree until the pointer, p, is null, indicating that all nodes in the tree have been processed. The outer loop contains two inner loops.

In step 520 the first inner loop finds the start of a module based upon the count determined in steps 420-450 above. While the count associated with the node pointed to by pointer p is less than a module inclusion limit, p is iteratively updated to point to the next node in the tree 530. The "next node" in one embodiment is defined as the first succeeding node in a depth-first traversal order that exceeds the module inclusion limit, or null if there is no such node. The "module inclusion limit" of one embodiment is a fixed integer (may be defined by the tester, or may be defined by some other person including the system developer or the person who configures the system) that defines a cutoff for including steps within a module. Steps that exceed the module inclusion limit are determined to become part of a module. When a node that exceeds the module inclusion limit is located, a "module start" pointer is set to that node in step 540. Note that if the module inclusion limit is not considered as part of this algorithm (or alternatively, if the limit is set to 1), all possible modules will be extracted.

After step 540 is executed, the second inner loop begins at step 550. The loop of step 550 locates all possible end points for the module and cycles through steps 560 and 570 as long as the count associated with node p is greater than or equal to the module inclusion limit, p is a descendent of the module start node, and p has retrievable descendants. In step 560, a "module end" pointer is set to the node pointed to by p, and in step 570, p is updated to point to the next node in the tree. A node is considered to have "retrievable descendants" if it has at least one child node that exceeds the module inclusion limit. When the end point loop 550 ends by encountering a node with a count that is less than the inclusion limit, the module end pointer will contain the end point of a potential module. The start module and end module pointers are then stored together in a list of potential modules in step 580, and p is updated to the next node in the tree in step 590. In step 595, the updated pointer, p, is checked to determine whether or not it is a descendant of the start node. If the answer is yes, the process moves back to step 550, where the module end loop is re-initiated. If the answer to the determination of step 595 is no, the process moves back up to step 510 where the next iteration of the outer loop is executed until completion.

The algorithm just described produces a list of potential modules. In some cases, items in the list will "overlap" by containing common subsequences. For example, two of the entries in the list might be ABC and ABCDE, where each letter indicates a step. Modules to be retained in the module library are extracted from the potential module list. A number of mechanisms can be employed in this extraction, including: retaining all entries, retaining only the common subsequences when there are multiple items that overlap (in the example just given, the common subsequence is ABC), retaining the longest sequence among overlapping entries (in the example, retaining only ABCDE), and allowing the tester to evaluate and select among the candidates.

Figure 6:
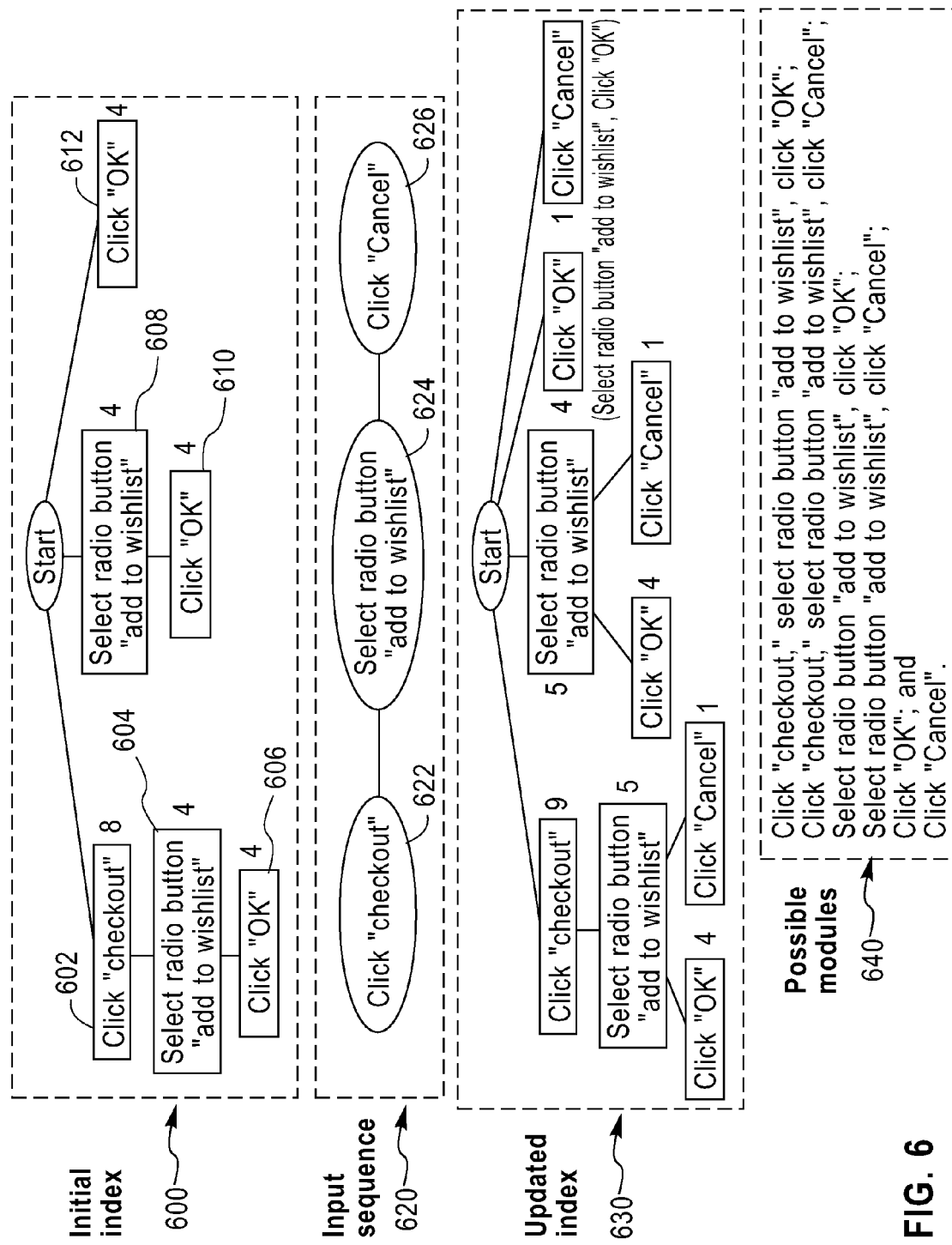
FIG. 6 is a graphical example of updating a module index and extracting possible modules from it in accordance with an embodiment of the present invention.

FIG. 6 shows one example of updating a module index and extracting possible modules from it in accordance with certain embodiments of the present invention. At the top of FIG. 6 is an initial index 600, previously constructed. FIG. 6 also shows a script sequence 620 that is to be used to update the index 600. Under the script sequence 620 is an updated index 630, which includes the input sequence 620, and where the updating is performed via the algorithm of FIG. 4. The bottom section of FIG. 6, 640, shows the possible modules extracted from the updated index, via the algorithm of FIG. 5.

More specifically, looking at the initial index 600, one exemplary sequence of steps available on a GUI interface is: 1. click "checkout" 602; 2. select a radio button called "add to wishlist" 604; and 3. then select "OK" 606. Another sequence is to: 1. select a radio button called "add to wishlist" 608 and 2. select "OK" 610. A third option is to only select the "OK" button 612. Now suppose a test script is written that include separate portions that execute any or all of these possible sequences of steps. If a programmer goes back in and adds a button called "cancel" to the test script needs to be updated to reflect the new option. This addition is shown in the additional input sequence 620, which includes the steps of 1. click "checkout" 622; 2. select a radio button called "add to wishlist" 644; and 3. then select "Cancel" 626. A resulting expanded possible steps tree is shown in the updated index 630. The numbers shown in these figures next to each of the steps indicate the number of combinations that use that particular step. Since there is now a "Cancel" option, there is an additional path that uses the "checkout" and "add to wishlist" buttons, which have each been incremented one from the initial index 600.

The specific possible test script modules based on the steps illustrated in the initial index 600 and in the additional input sequence 620 are now, for example as shown in 640:

1. Click "checkout," select radio button "add to wishlist", click "OK";
2. Click "checkout," select radio button "add to wishlist", click "Cancel";
3. Select radio button "add to wishlist", click "OK";
4. Select radio button "add to wishlist", click "Cancel";
5. Click "OK"; and
6. Click "Cancel".

As can be seen above, the test script module indicated as "3" above is a test script module that is part of script "1." Defining test script module "1" to include an identification of the test script module indicated as "3" as a component of script "1" allows maintenance of script "3" to also result in the maintenance of script "1" and any other script that contains the same module.

Figure 7:
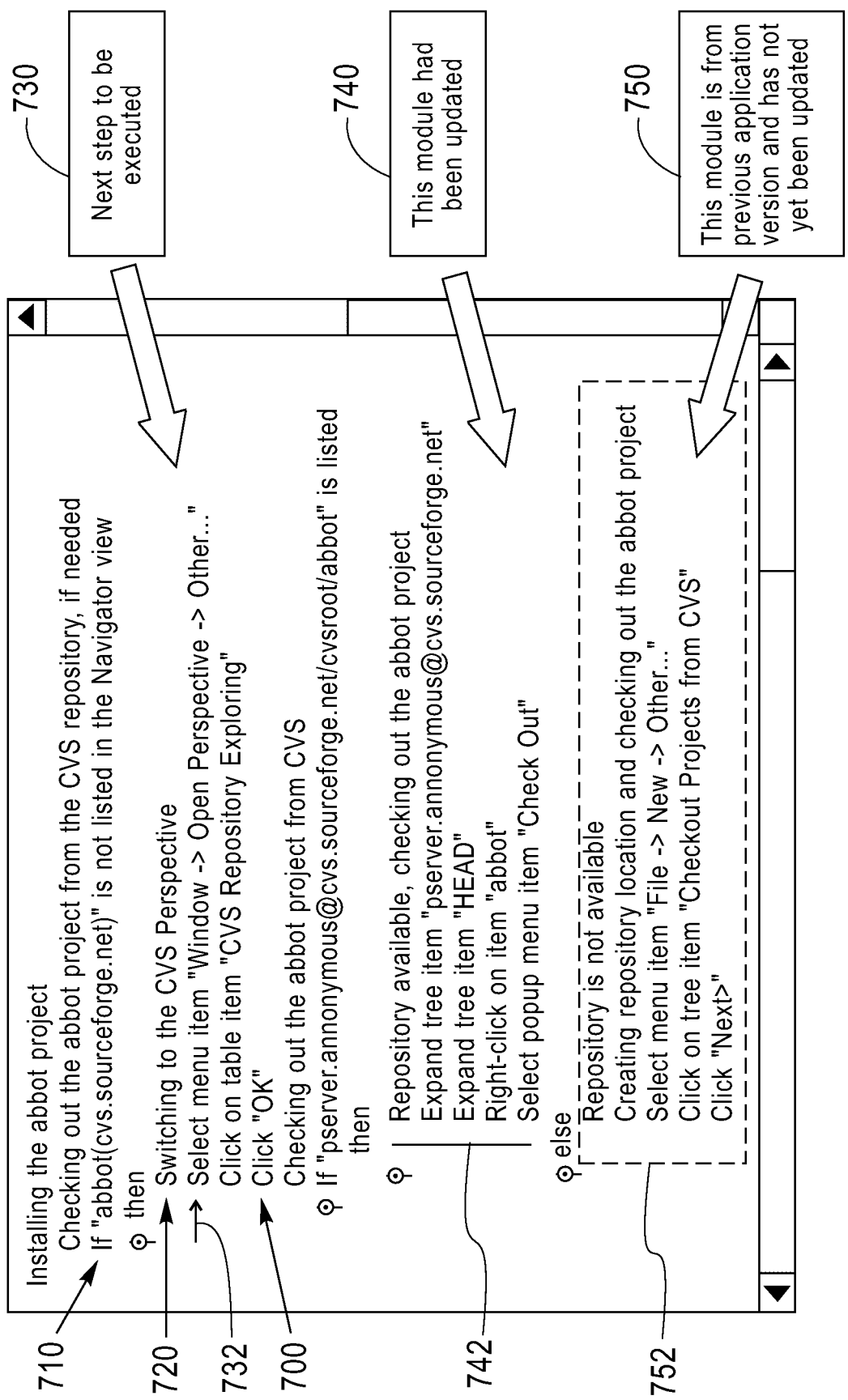
FIG. 7 is an example of example of script rendering in accordance with an embodiment of the present invention.

FIG. 7 shows an example of script rendering in accordance with an embodiment of the present invention. As is shown in FIG. 7, the script is presented as human-readable text, which includes basic GUI operations 700, control logic such as conditionals and loops 710, and statements which provide description or group other statements 720. A variety of other representations are possible, including graphical or pictorial representations. Optionally, the rendering may be used as part of the playback.

When playing back a script, the script rendering can show the current step being executed 730, such as is indicated by a current instruction arrow 732 in this example. It should also be noted that one possible method for module respecification is by demonstration. In this case, playback indicating the currently executing portion of the test script can be used to get the application into the state required for re-recording a module. Both updated modules 740 and un-updated modules 750 are shown. This helps the tester to understand, in-context, the portions of a script that require attention. In this example, the updated modules 740 are shown with a vertical bar 742 on the left side of the updated module 740. The un-updated modules 750 are indicated by being enclosed in a dotted line box 752. Further embodiments are able to indicate updated modules 740 and un-updated modules 750 by any suitable means, such as backgrounds of different colors to indicate updated and un-updated test script modules, differently colored text for each type of script module, combinations of colors, and the like.

Generalized Architecture for a Computer System

Figure 8:
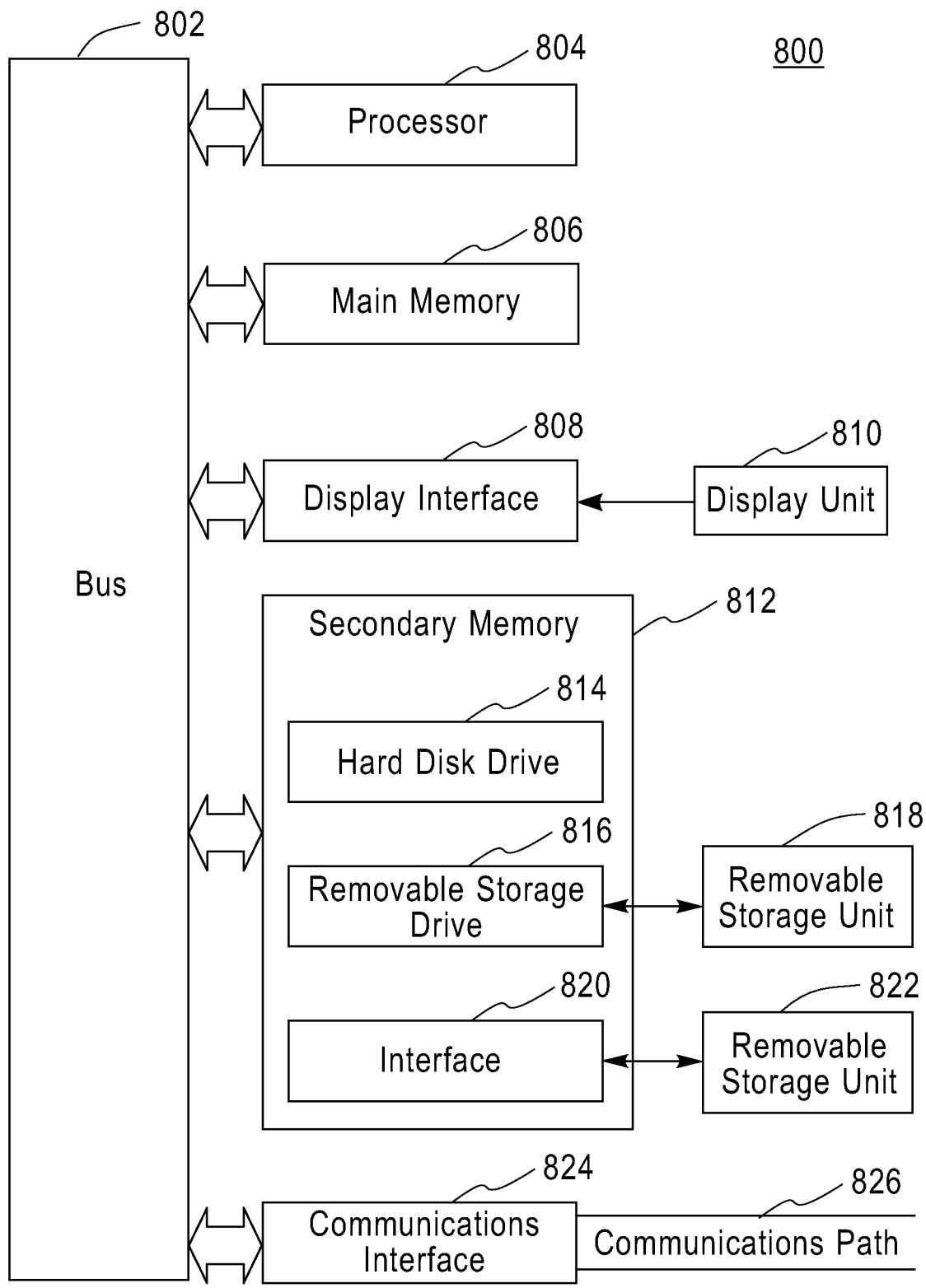
FIG. 8 is a block diagram of a computer system useful for implementing an embodiment of the present invention.

FIG. 8 is a block diagram of a computer system useful for implementing an embodiment of the present invention. The computer system includes one or more processors, such as processor 804. The processor 804 is connected to a communication infrastructure 802 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. Removable storage drive 816, reads and writes to a removable storage unit 818, floppy disk, magnetic tape, optical disk, etc., storing computer software and/or data.

In alternative embodiments, the secondary memory 812 may include other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 acts as both an input and an output and allows software and data to be transferred between the computer system and external devices. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

As has now been described, embodiments of the present invention facilitate the maintenance of script libraries by presenting an inventive methodology of extracting common sub-procedures from an existing script library and employing the common sub-procedures in a semi-automated process for updating the script library when the application being tested undergoes changes to its GUI structure.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method of maintaining a collection of test scripts, the method comprising:
   identifying at least one common test script module present within at least two unmodularized test scripts,
      wherein the at least one common test script module is contained within each of the at least two unmodularized test scripts, and
      wherein each of the at least two unmodularized test scripts are associated with a common application;
   dividing, based at least in part on comparing a task coverage of a portion of the at least two unmodularized test scripts to a respective task coverage of one or more common test script modules stored in a module library, the at least two unmodularized test scripts into a set of modularized test scripts that comprises the at least one common test script module;
   receiving an update to the common application; and
   updating the at least one common test script module in response to the update of the common application, whereby updating the at least one common test script module causes a corresponding update to the at least two unmodularized test scripts.

2. The method according to claim 1, further comprising:
   storing the at least one common test script module in a module library; and
   determining that a task coverage of the at least one common test script module is one of greater than and not within a task coverage of the one or more of the modules stored in the module library,
   wherein the identifying comprises identifying the at least one common test script module, based upon the determining, to be one of the modules stored in the module library.

3. The method according to claim 1, wherein the identifying is based at least in part on:
   identifying a task that is accomplished by a portion of a first test script; and identifying a portion of a second test script that accomplishes the task.

4. The method according to claim 3, wherein the identifying further comprises:
defining the at least one common test script module as a set of steps that accomplishes the task.

5. The method according to claim 3 wherein identifying a portion of a second test script that accomplishes the task comprises:
comparing the portion of the first test script to the portion of the second test script;
assigning, based on the comparing, a score to a comparison of the portion of the first test script and the portion of the second test script based at least in part on a correspondence of the portion of the first test script to the portion of the second test script; and
comparing the score to a minimum score, where in the identifying at least one common test script module is based upon the score exceeding the minimum score.

6. The method according to claim 5 where the score is based on at least one of:
an action executed by individual steps in the test script;
a description of content of a GUI contained in individual steps in the test script; and
a combination of the action and the description of content.

7. The method according to claim 1, further comprising:
storing the at least one common test script module in a module library; and
ranking the at least one common test script module among a group of common test script modules in the module library, wherein the ranking is based on a number of test scripts to which the at least one common test script module is common.

8. The method according to claim 1, further comprising:
presenting to a user, prior to the updating, a list of common test script modules associated with the application;
indicating to the user which modules in the list of common test script modules require updating; and
accepting a selection from the user of the common test script modules to be updated.

9. The method according to claim 1, further comprising:
storing the at least one common script module in a module library;
removing, from the module library, modules with tasks covered by at least one of:
the identified module; and
the identified module and one or more of the modules already stored in the module library.

10. An apparatus for maintaining a collection of test scripts, the apparatus comprising:
an input adapted to receive test scripts and application data;
a memory adapted to store data; and
a processor adapted to:
identify at least one common test script module present within at least two unmodularized test scripts, wherein the at least one common test script module is contained within each of the at least two unmodularized test scripts, and wherein each of the at least two unmodularized test scripts are associated with a common application;
divide, by at least in part comparing a task coverage of a portion of the at least two unmodularized test scripts to a respective task coverage of one or more common test script modules stored in a module library, the at least two unmodularized test scripts into a set of modularized test scripts that comprises the at least one common test script module;
receive an update to the common application; and update the at least one common test script module in response to the update of the common application, whereby updating the at least one common test script module causes a corresponding update to the at least two unmodularized test scripts.

11. The apparatus according to claim 10, wherein the processor is further adapted to:
storing the at least one common script module in a module library; and
determining that a task coverage of the at least one common test script module is one of greater than and not within a task coverage of the one or more of the modules stored in the module library,
wherein the identifying comprises identifying the at least one common test script module, based upon the determining, to be one of the modules stored in the module library.

12. The apparatus according to claim 10, wherein the processor is further adapted to:
identify a task that is accomplished by a portion of a first test script; and
identify a portion of a second test script that accomplishes the task.

13. The apparatus according to claim 12, wherein the processor is further adapted to:
define the at least one common test script module as a set of steps that accomplishes the task.

14. The apparatus according to claim 12, wherein the processor is able to identify a portion of a second test script that accomplishes the task by:
comparing the portion of the first test script to the portion of the second test script;
assigning, based on the comparing, a score to a comparison of the portion of the first test script and the portion of the second test script based at least in part on a correspondence of the portion of the first test script to the portion of the second test script; and
comparing the score to a minimum score, where in the identifying at least one common test script module is based upon the score exceeding the minimum score.

15. The apparatus according to claim 14 where the score is based on at least one of:
an action executed by individual steps in the test script;
a description of content of a GUI contained in individual steps in the test script; and
a combination of the action and the description of content.

16. The apparatus according to claim 10, wherein the processor is further adapted to:
store the at least one common test script module in a module library; and
rank the at least one common test script module among a group of common test script modules in the module library, wherein the ranking is based on a number of test scripts to which the at least one common test script module is common.

17. The apparatus according to claim 10, further comprising:
an output adapted to:
present to a user, prior to the updating, a list of common test script modules associated with the application; and
indicate to the user which modules in the list of modules require updating, wherein the input accepts a selection from the user of the module for updating.

18. A computer program product for maintaining a collection of test scripts, the computer program product comprising:
- a computer storage device readable by a processing circuit and tangibly storing instructions for execution by the processing circuit for performing a method comprising:
- identifying at least one common test script module present within at least two unmodularized test scripts,
  - wherein the at least one common test script module is contained within each of the at least two unmodularized test scripts, and
  - wherein each of the at least two unmodularized test scripts are associated with a common application;
- dividing, based at least in part on comparing a task coverage of a portion of the at least two unmodularized test scripts to a respective task coverage of one or more common test script modules stored in a module library, the at least two unmodularized test scripts into a set of modularized test scripts that comprises the at least one common test script module;
- receiving an update to the common application; and
- updating the at least one common test script module in response to the update of the common application, whereby updating the at least one common test script module causes a corresponding update to the at least two unmodularized test scripts.

\* \* \* \* \*